Patented Apr. 15, 1941

2,238,613

UNITED STATES PATENT OFFICE 2,238,613

WOUND MOTOR ROTOR CONTROL

William R. Wickerham, Swissvale, Pa., assignor to Westinghouse Electric & Manufacturing Company, East Pittsburgh, Pa., a corporation of Pennsylvania Application July 20, 1940, Serial No. 346,553

12 Claims. (Cl. 172—179)

My invention relates to a speed control system for an electric motor and is more specifically directed to a control system embodying a specific form of saturable core reactor which operates a relay in response to the attainment of a predetermined speed by the motor.

An object of my invention is to provide a control system for a reversible hoist motor, which control system includes a plurality of saturable core-reactor-type relays which are used for speed limit acceleration during hoist operation of the motor and one of which relays is used as an overspeed device during the lowering operation of the motor.

Another object of my invention is to provide a specific saturable core-reactor-type relay which is normally saturated and which is effective only upon unsaturation thereof as the result of the attainment of a particular value of speed of an electric motor.

Another object of my invention is to apply a saturable core-reactor-type relay to a hoist-motor control system for preventing the motor speed from exceeding a predetermined value of over-speed.

Other objects and advantages will become more apparent from a study of the following specification when considered in conjunction with the accompanying drawings, in which.

Figure 1:
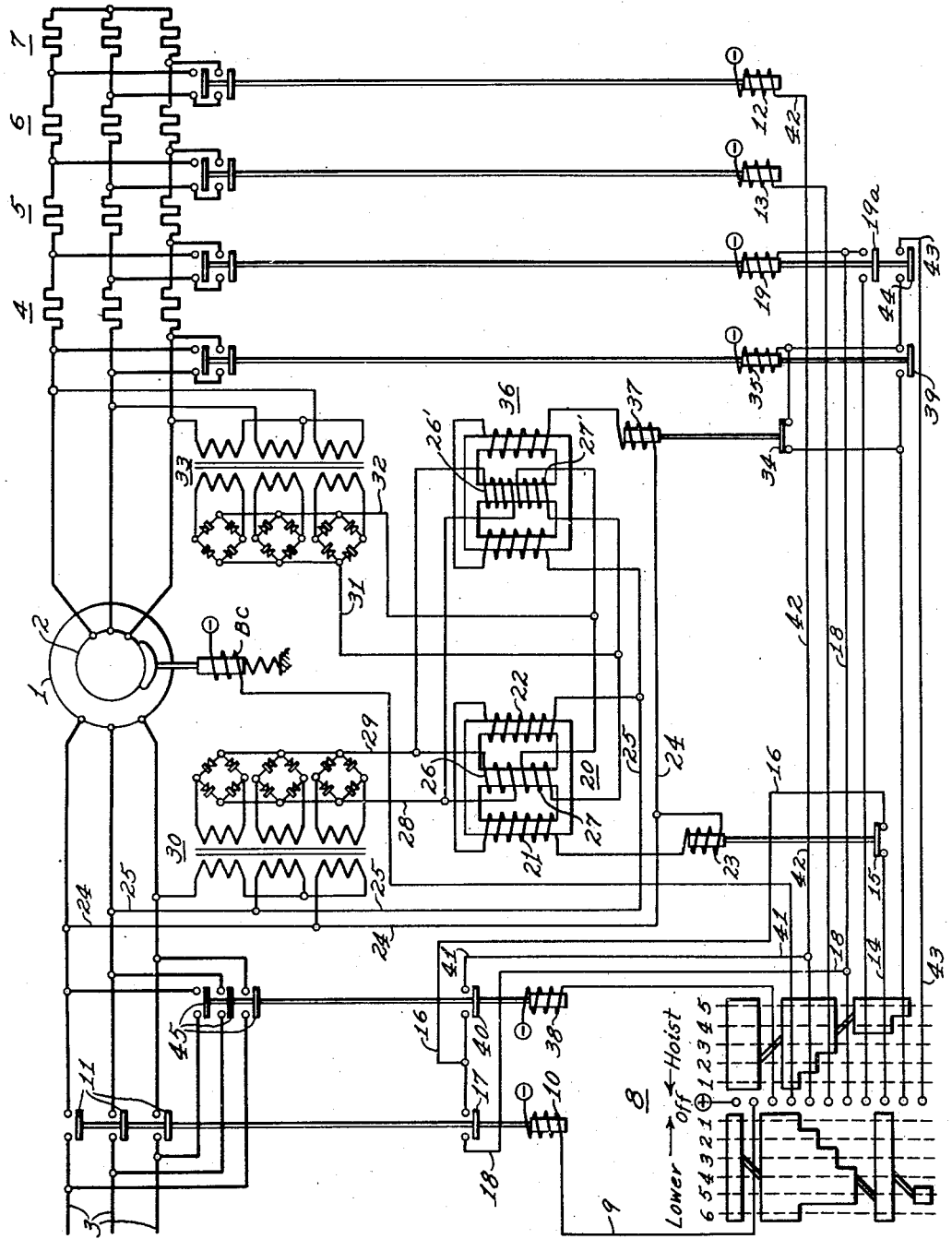
Figure 1 is a schematic showing of a control system embodying the principles of my invention.

Referring more particularly to Figure 1, numerals 1 and 2 denote the stator and rotor windings respectively of a wound rotor induction motor. The stator winding is energized by a suitable three-phase alternating current source 3 and the rotor windings 2 have connected thereacross a plurality of resistor units 4, 5, 6, and 7. A drum controller 8 is used to control the direction and speed of operation of the motor.

Figure 3:
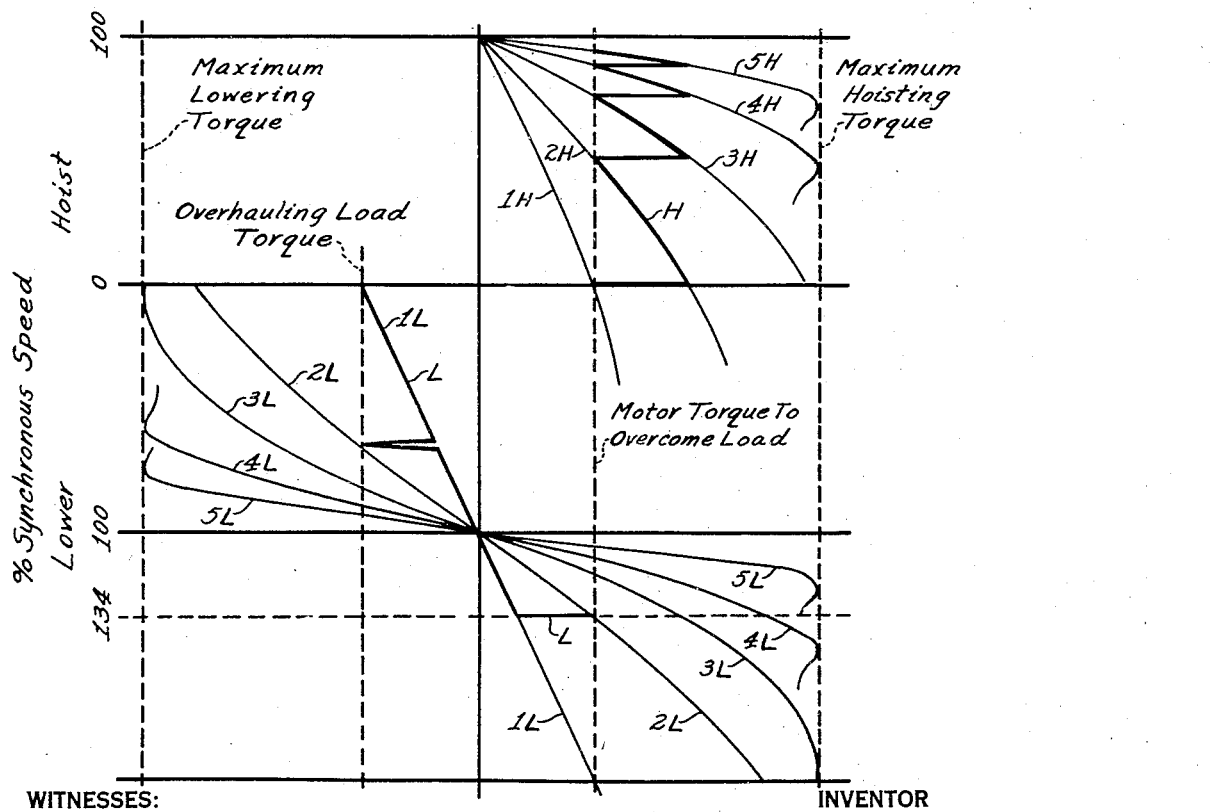
Fig. 3 is a chart showing the speed-torque characteristic curves in both hoisting and lowering of the hoist-motor.

The operation of the device is as follows:

Assume that it is desired to operate the motor in a hoist direction. When the controller is moved to the number 1 hoist positon, an energizing circuit is completed which may be traced from the terminal marked (+) of a suitable direct current source through the bridging portion of the controller segment through conductor 9, actuating coil 10, to the terminal marked (—) of said suitable source of direct current potential. Energization of the coil 10 effects closing of line contact members 11, thereby completing the alternating current circuit to the stator winding 1 in such direction as to effect operation of the motor in the hoisting direction. Another circuit will be controlled through the brake coil BC to effect release of the spring applying bias thereon. On moving controller 8 to the No. 2 hoist position, a circuit is completed through actuating coil 12, as will be readily apparent, which effects shunting of resistor unit 7. Likewise, upon movement of the controller to the No. 3 hoist position, a circuit will be completed through actuating coil 13 which will effect shunting of resistor unit 6 to still further increase the motor speed. As the controller is moved to the No. 4 hoist position, it will be apparent that a set-up circuit will be completed extending from the conductor 14, speed switch 15, (that is, after switch 15 has been closed), conductor 16, contact members 17, conductor 18, actuating coil 19 to the (—) terminal. Referring to Fig. 3, curve H denotes the speed characteristic and curves 1H to 5H, inclusive, denote the various resistance steps. So far, the controller system described has been conventional and represents no part of any invention.

At this point, however, the means for effecting closing of the speed switch 15 forms one of the essential parts of my invention and comprises, in general, a saturable core reactor 20 having three legs, the two end legs having wound thereon coils 21 and 22 which are connected in series with the actuating coil 23 of the speed switch 15 and both of which coils are energized through conductors 24 and 25 which are connected across one of the phases of the three-phase constant frequency alternating current supply source 3. In addition, the saturable core reactor 20 has two oppositely wound coils on its middle leg, namely, 26 and 27, the coil 26 being energized through conductors 28 and 29 which are connected to the output of a three-phase transformer and dry-type rectifier unit denoted generally by unit 30. In other words, coil 26 is energized by a constant potential source of direct current potential. On the other hand, the coil 27 is energized through conductors 31 and 32 which are, in turn, connected to a second three-phase transformer-rectifier unit denoted generally by numeral 33, but which unit is energized by the voltage in the rotor winding 2. It will thus be seen the coil 27 of the saturable core reactor has impressed thereon a variable magnetomotive force which is directly proportional to the voltage induced in the rotor winding 2 or the speed of the rotor.

Let it be assumed that it is desired to operate the saturable core reactor 20 at 66% normal speed. This means that the ampere turns of coil 27 will completely nullify the ampere turns of coil 26 upon the attainment of 66% speed, thereby desaturating the reactor, thus greatly increasing the impedance of coils 21 and 22 which effects lowering of the current and decreasing of the applied voltage across coil 23 to such an extent that it can no longer maintain the speed contact 15 open.

Figure 2:
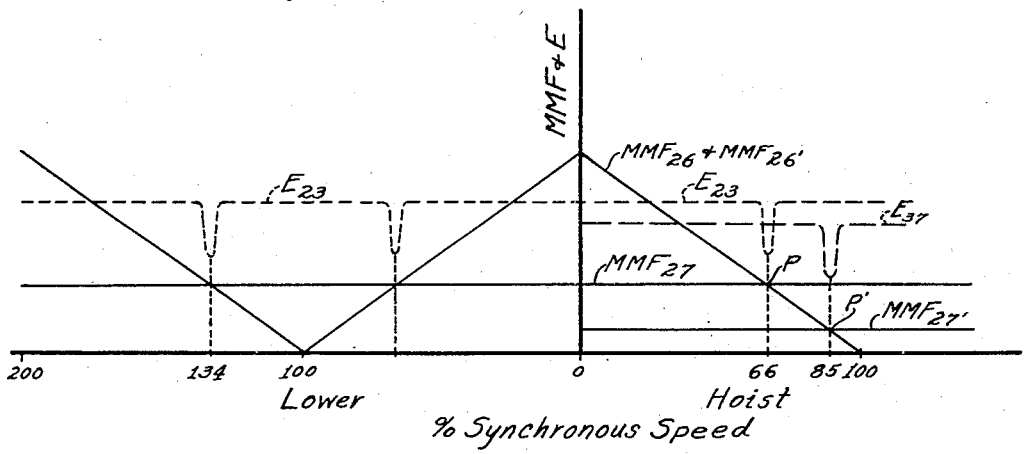
Fig. 2 is a chart showing certain characteristic curves of the saturable core reactors used in Fig. 1.

The action which takes place can be more readily understood from the inspection of Fig. 2. The curve marked $MMF_{26}$ represents the constant value of magnetomotive force flowing through coil 26 and the curve marked $MMF_{27}$ indicates the magnetomotive force through coil 27 as plotted against speed. In addition, there is shown curve $E_{23}$ which indicates the voltage across coil 23 for various values of speed. It will be apparent that when reactor 20 is saturated, which is normally the case, the impedances of coils 21 and 22 are relatively small; hence the voltage drop thereacross is small as compared to the voltage drop across coil 23. However, when 66% speed is attained and the ampere turns of coils 26 and 27 nullify each other and unsaturate the core, the impedances of coils 21 and 22 will suddenly increase substantially, thereby making the voltage drop thereacross high as compared to the voltage drop across coil 23. This will account for the sudden drop of curve $E_{23}$ at point P, which point represents the 66% speed mark or the point of unsaturation of the core 20.

Continuing further with the analysis of the control system, in Figure 1, it is thus seen that speed switch 15 will close only upon attainment of the 66% speed value of the motor and at which time it will complete the previously mentioned circuit extending through the actuating coil 19 which in turn will effect operation of the associated relay and shunting of resistor unit 5 so as to effect further speeding up of the motor. Although speed switch 15 opens upon passing the 66% speed value, the interlocking contact members 19a effect shunting therefore maintaining the circuit. As the control is moved to the No. 5 position hoist, there will be a similar circuit which is closed only upon closing of the speed switch 34 in order to energize actuating coil 35 of the last resistor shunting relay for shunting resistor unit 4. The circuit through coil 35 will be maintained by virtue of interlocking contact member 39 which shunts the speed switch 34. It will be noted that a saturable core reactor denoted generally by numeral 36 is used to operate coil 37 of the speed switch 34. In this case, however, the reactor instead of being calibrated for 66% speed, is calibrated for a higher value speed such as for 85% speed. Such calibration may be effected by changing the number of turns or the cross-section of the winding. Hence the coil 37 will not allow closing of the speed switch 34 until such speed has been attained.

Referring to Fig. 2, the curve $MMF_{27'}$ indicates the magnetomotive force through coil 27', and curve $MMF_{26'}$ which may coincide with curve $MMF_{26}$ representing the magnetomotive force through coil 26'. The point P' represents the 85% speed mark or point of unsaturation of the core 36. At this point the voltage drop across coil 37 will become high which accounts for the sudden drop in curve $E_{37}$. It is thus seen that a plurality of saturable core reactors may be used in accordance with my invention to effect speed acceleration of the motor. Although two speed steps are shown it is obvious that any additional steps may be added if desired. An inspection of Fig. 3 will show the speed-torque characteristic curve H during hoisting as the various resistor units are shunted.

Assume that it is desired to reverse the operation of motor 1 and to effect lowering of a suitable load (not shown). The controller 8 is moved to the No. 1 lower position, thereby effecting completion of an energizing circuit through actuating coil 38 which will effect closing of contact members 45 for reversing the phase sequence of the alternating current source as applied to the stator winding 1. Another circuit will be completed through actuating coil BC to effect release of the brake. Still another circuit will be completed which may be traced from conductor 14, through speed switch 15 (assuming that it is closed), conductor 16, contact members 40, conductors 41 and 42, actuating coil 12 to the (—) terminal. This circuit, of course, will not be completed until the speed switch 15 has been closed by virtue of the attainment of 134% speed, that is, 34% overspeed of the motor. An inspection of Fig. 3 will clearly show the characteristic curve denoted by L.

When lowering on the first position of the controller speed switch 15 will close momentarily at 66% of synchronous lowering speed. However, there is no effect since the lowering load torque is, at this point, still greater than the motor countertorque. The lower speed increases to 134% or 34% over-synchronous lowering speed and at this point the speed switch 15 again closes its contacts since the coils 26 and 27 nullify each other again and this time the motor torque is of such value as to oppose the lowering load torque so as to maintain a constant lowering speed.

In tracing curve L in the lowering direction, it will be seen that at 66% speed, the curve attempts to shift to curve 2L but immediately returns. This is effected by virtue of the speed normally passing through the 66% speed mark at which switch 15 closes and suddenly opens again. However, when the speed reaches 134% speed, switch 15 again closes effecting operation of actuating coil 12 which in turn effects shunting of resistor 7, hence, a shifting from curve 1L to curve 2L thereby limiting the speed of the motor. In moving the controller to the No. 2 lower position without first stopping at the No. 1 position, a circuit is completed through coil 12 to effect shunting of resistor unit 7 for the first speed step. Similarly, in moving directly to the No. 3 lower position, a circuit is completed through coil 13 which will effect shunting of resistor unit 6. Likewise, in moving directly to the No. 4 position, a circuit will be completed through coil 19 to effect shunting of resistor unit 5. In moving to the No. 5 position, a circuit is completed from conductor 43 through contact members 44, actuating coil 35, to the (—) terminal, thereby energizing such coil and effecting shunting of resistor unit 4.

These characteristics in the lowering direction may be seen by an inspection of Fig. 3 from which can be seen that the safe overspeed of 34% is maintained in the lowering direction at all times. In operating on curves 2L, 3L, 4L and 5L in the lowering direction, however, overspeed of 34% is never obtainable because of the motor speed torque characteristic for these particular values of rotor resistance.

I am, of course, aware that others particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A speed control system for an electric motor comprising, in combination, an electrical motor, a source of energizing potential therefor, accelerating means for said motor including resistance means together with a relay and saturable reactor for inserting or shunting said resistance means in the system, said saturable core reactor insulating two oppositely wound coils, one of which is energized by a constant source of potential and the other of which is energized by a source of potential which varies directly according to motor speed, and normally operating saturated until a predetermined motor speed is attained at which said coils substantially completely neutralize each other, thereby desaturating the reactor, thereby effecting operation of said relay and insertion or shunting of said resistance means.

2. A speed control system for an electric motor comprising, in combination, an electrical motor, a source of energizing potential therefor, accelerating means for said motor including resistance means together with a relay and saturable reactor for inserting or shunting said resistance means in the system, said saturable core reactor insulating two oppositely wound coils, one of which is energized by a constant source of potential and the other of which is energized by a source of potential which varies directly according to motor speed, and normally operating saturated until a predetermined motor speed is attained at which said coils substantially completely neutralize each other, thereby desaturating the reactor, thereby effecting operation of said relay and insertion or shunting of said resistance means, and means including said saturable core reactor for preventing overspeed operation of said motor.

3. An overspeed control system for an electric motor comprising, in combination, an electric motor, a source of energizing potential therefor, and an overspeed control circuit including a saturable core reactor including two oppositely wound coils, one of which is energized by a constant source of potential and the other of which is engaged by a source of potential which varies directly according to motor speed, and normally operating saturated until a predetermined overspeed of the motor is attained at which said coils substantially completely neutralize each other, thereby desaturating the reactor, and a relay which is operated only upon each desaturation to effect a slowing down action on said motor.

4. A speed control system for an electric motor comprising, in combination, a wound rotor motor having a stator winding and a rotor winding, a source of alternating current energizing potential for said stator winding, resistance means connected across said rotor winding, relay means for shunting said resistance means upon the attainment of a predetermined motor speed, said relay means including a saturable core reactor having a winding which is energized by said alternating current source, a second winding which is wound in opposition to the first and which is energized by current in said rotor winding and having a third winding energized by said alternating current source, said relay means being in circuit relationship with said third winding.

5. A speed control system for an electric motor comprising, in combination, a wound rotor motor having a stator winding and a rotor winding, a source of alternating current energizing potential for said stator winding, resistance means connected across said rotor winding, relay means for shunting said resistance means upon the attainment of a predetermined motor speed, said relay means including a saturable core reactor having a second winding which is wound in opposition to the first and which is energized by voltage induced in said rotor winding and having a third winding energized by said alternating current source, and a pair of rectifiers, one inserted between said first winding and said alternating current source and the other inserted between said rotor winding and said second winding, said relay means being in circuit relationship with said third winding.

6. A speed control system for an electric motor comprising, in combination, a wound rotor motor having a stator winding and a rotor winding, a source of alternating current energizing potential for said stator winding, resistance means connected across said rotor winding, a plurality of relays, each of which is effective to shunt a portion of said resistance means upon the attainment of a predetermined motor speed, each of said relays including a saturable core reactor having a winding which is energized by said alternating current source, a second winding which is wound in opposition to the first and which is energized by voltage induced in said rotor winding and having a third winding energized by said alternating current source, each of said relays being in circuit relationship with the third winding of its respective saturable core reactor.

7. A speed control system for an electric motor comprising, in combination, a wound rotor motor having a stator winding and a rotor winding, a source of alternating current energizing potential for said stator winding, resistance means connected across said rotor winding, a plurality of relays, each of which is effective to shunt a portion of said resistance means upon the attainment of a predetermined motor speed, each of said relays including a saturable core reactor having a winding which is energized by said alternating current source, a second winding which is wound in opposition to the first and which is energized by voltage induced in said rotor winding and having a third winding energized by said alternating current source, each of said relays being in circuit relationship with the third winding of its respective saturable core reactor, each of said saturable core reactors having a rectifier inserted between its first winding and said alternating current source, and between its second winding and the rotor winding.

8. A speed control system for a hoist motor comprising, in combination, a reversible wound rotor motor having a stator winding, resistance means connected across said rotor winding, including a saturable core reactor having a winding which is energized by said alternating current source, a second winding which is wound in opposition to the first and which is energized by voltage induced in said rotor winding and having a third winding energized by said alternating current source, said relay means being in circuit relationship with said third winding, and means for reversing the direction of rotation of said motor including circuit means for connecting said saturable core reactor as an overspeed device for such reverse operation of said motor.

9. A speed control system for a hoist motor comprising, in combination, a reversible wound rotor motor having a stator winding, resistance means connected across said rotor winding, and means for preventing overspeed of said motor in a lowering direction of the hoist comprising relay means for shunting said resistance means upon the attainment of a predetermined motor speed, said relay means including a saturable core reactor having a winding which is energized by said alternating current source, a second winding which is wound in opposition to the first and which is energized by voltage induced in said rotor winding and having a third winding energized by said alternating current source, said relay means being in circuit relationship with said third winding.

10. A speed control system for a hoist motor comprising, in combination, a reversible wound rotor motor having a stator winding, resistance means connected across said rotor winding, and means for preventing overspeed of said motor in a lowering direction of the hoist comprising relay means for shunting said resistance means upon the attainment of a predetermined motor speed, said relay means including a saturable core reactor having a winding which is energized by said alternating current source, a second winding which is wound in opposition to the first and which is energized by voltage induced in said rotor winding and having a third winding energized by said alternating current source, and a pair of rectifiers, one inserted between said first winding and said alternating current source and the other inserted between said rotor winding and said second winding, said relay means being in circuit relationship with said third winding.

11. In an electrical control system including a constant frequency source of alternating current and a variable voltage source of alternating current, a pair of rectifier units, a saturable core reactor having three windings thereon, the first being energized by said constant frequency source through one of said rectifier units, the second being energized by said variable voltage source of alternating current through the other of said rectifier units and the third being directly energized by said constant frequency source and having connected in series therewith a shunt relay coil, said first and second coils being oppositely wound and being effective, upon the attainment of a particular voltage of said variable voltage source, to desaturate said reactor and effect energization and operation of said shunt relay coil.

12. A control system including a constant frequency alternating current source, a constant direct current source and a variable direct current source, a saturable reactor having a three-legged core upon one of which are wound two coils, in opposition, one of which is energized by said variable direct current source and the other of which is energized by said constant direct current source, a third winding on a separate leg or having an external shunt coil connected in series therewith and energized by said alternating current source, said reactor normally operating in a saturated condition until the attainment of a predetermined value of variable direct current at which the ampere turns of the first and second coils neutralize each other, unsaturating the core and effecting operation of said external shunt.

WILLIAM R. WICKERHAM.